United States Patent
Sundaram

(10) Patent No.: US 11,294,127 B2
(45) Date of Patent: Apr. 5, 2022

(54) FREE AIR INTRASYSTEM INTERCONNECT

(71) Applicants: Intel Corporation, Santa Clara, CA (US); Arvind Sundaram, Bangalore (IN)

(72) Inventor: Arvind Sundaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 504 days.

(21) Appl. No.: 16/326,443

(22) PCT Filed: Sep. 29, 2016

(86) PCT No.: PCT/US2016/054380
§ 371 (c)(1),
(2) Date: Feb. 19, 2019

(87) PCT Pub. No.: WO2018/063227
PCT Pub. Date: Apr. 5, 2018

(65) Prior Publication Data
US 2021/0278612 A1  Sep. 9, 2021

(51) Int. Cl.
*G02B 6/42* (2006.01)
(52) U.S. Cl.
CPC ........... *G02B 6/4246* (2013.01); *G02B 6/421* (2013.01); *G02B 6/4204* (2013.01); *G02B 6/4257* (2013.01)
(58) Field of Classification Search
CPC .. G02B 6/4204; G02B 6/4246; G02B 6/4257; G02B 6/421

(Continued)

(56) References Cited

U.S. PATENT DOCUMENTS

| 5,525,190 A | 6/1996 | Wojnarowski et al. |
| 6,571,045 B2 * | 5/2003 | Hasegawa ............. B82Y 20/00 385/125 |

(Continued)

FOREIGN PATENT DOCUMENTS

WO   WO-2018063227 A1   4/2018

OTHER PUBLICATIONS

"International Application Serial No. PCT US2016 054380, International Preliminary Report on Patentability dated Apr. 11, 2019", 9 pgs.

(Continued)

*Primary Examiner* — Michael P Mooney
(74) *Attorney, Agent, or Firm* — Schwegman Lundberg & Woessner, P.A.

(57) ABSTRACT

This document discusses, among other things, systems and methods to transmit laser energy to a first hollow-core transmission medium of a board, and to detect laser energy from a second hollow-core transmission medium of the board using a photodiode of the communication interface. A system can include a communication interface configured to be coupled to a chip carrier, the communication interface including a laser emitter configured to transmit laser energy to a first hollow-core transmission medium of a board, and a photodiode configured to detect laser energy communicated from a second hollow-core transmission. The system can further include the chip carrier and the board, as well as one or more alignment features to position the laser emitter and the photodiode over inputs of the first and second hollow-core transmission mediums, and an optically clear resin optionally between the communication interface and the board.

20 Claims, 5 Drawing Sheets

(58) Field of Classification Search
USPC .............................................. 385/14, 88–92
See application file for complete search history.

(56) References Cited

U.S. PATENT DOCUMENTS

| | | | |
|---|---|---|---|
| 7,486,847 B1 | 2/2009 | Dellmann et al. | |
| 2004/0057677 A1* | 3/2004 | Jacobowitz | G02B 6/43 385/89 |
| 2005/0146076 A1* | 7/2005 | Alexander | D03D 1/0088 264/257 |
| 2009/0202203 A1 | 8/2009 | Budd et al. | |
| 2011/0084047 A1* | 4/2011 | Yeo | G02B 6/43 216/24 |

OTHER PUBLICATIONS

"International Application Serial No. PCT/US2016/054380, International Search Report dated Feb. 27, 2017", 3 pgs.
"International Application Serial No. PCT/US2016/054380, Written Opinion dated Feb. 27, 2017", 7 pgs.

* cited by examiner

FREE AIR INTRASYSTEM INTERCONNECT

CLAIM OF PRIORITY

This patent application is a U.S. National Stage Application under 35 U.S.C. 371 from International Application No. PCT/US2016/054380, filed Sep. 29, 2016, published as WO2018/063227, which is incorporated herein by reference.

TECHNICAL FIELD

Embodiments pertain to high-speed interconnections in electronic systems, and more specifically to free-air intrasystem interconnect.

BACKGROUND

Electronic systems often include electronic devices that communicate signals among each other. Designers of electronic systems strive to increase the speed of the communication among devices while keeping the communication link robust. Wireless connections can be more robust than wired connections because of the elimination of the need for mechanical contact for communication that may be susceptible to wear. Wireless interfaces typically communicate using radio frequency (RF) signals. However, some limitations of RF communication interfaces include bandwidth limitations, signal interference, and overhead associated with RF protocols. Optical signals can be an alternative to RF and can achieve higher data rates. However, traditional optical interconnects require special fiber-optic cables, which can be more expensive than wired interfaces, and can require air tight glass-to-glass connections to prevent Fresnel reflections, making them less desirable and, in certain examples, impractical for day-to-day free-air interconnects. There is a general need for high-speed, low-cost, more robust devices, systems, and methods for high-speed interconnections among electronic devices.

DETAILED DESCRIPTION

Figure 1:
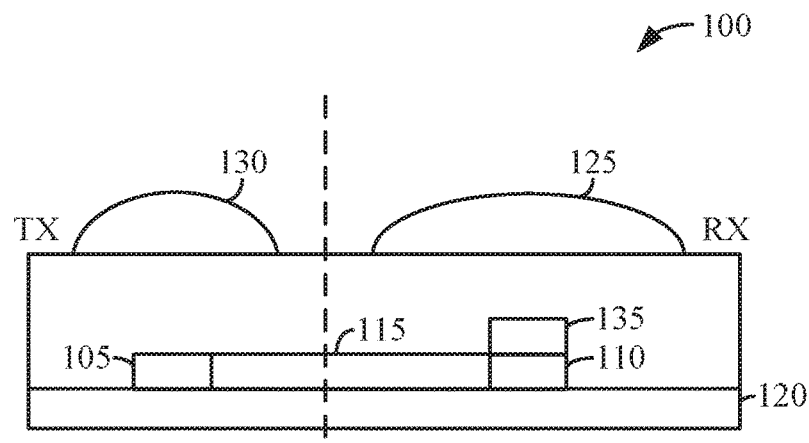
FIG. 1 is an illustration of an optical transmitter (TX) receiver (RX) pair in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

There are many types of intraboard or intrasystem communication interfaces between electronic devices. These include flex cabling, small gauge coaxial (SGC) cabling, or other board-to-board or intrasystem cabling. However, copper cables suffer from physical limitations. With increasing circuit speeds and decreasing board sizes, the physical limit for routing parallel high-speed copper interconnects is approaching. A faster alternative is desired to transport high-speed signals, such as within the board or otherwise within a system. With reducing rise times and longer trace lengths, it is also desired that the interconnect be robust and have high noise immunity. Power and cost, as well as ease of use, are also desired.

As such, it is desirable to implement a wireless communication interface that can provide improved data rate and can adapt basic wireless interconnection with existing protocols (e.g., universal serial bus (USB), mobile industry processor interface (MIPI), peripheral component interconnect (PCI), PCI express (PCIe), high definition multimedia interface (HDMI), Thunderbolt (TBT), display port (DP), or other serial busses and serial-parallel busses used in consumer electronics, enterprise class devices, wearable electronic devices, portable computers, or tablet computers), yet not be tied to any one specific protocol. An infrared-based (IR-based) interface is an alternative to an RF interface, but an IR-based interface involves conversion between protocols, which adds overhead to the communication. A laser-based optical interface requiring a fiber-optic cable or interconnect can meet some of these requirements, but the cost of fiber-optic based optical interconnections, as well as the high power and strict connection requirements for high noise immunity, can be prohibitive.

A laser-based optical communication interface, such as a light amplitude modulation docking adapter (LAMDA), does not require fiber optics to transmit and receive the laser emitted signals, but instead can transmit an optical signals via free-air space. This can be accomplished by communicating the optical signals over short distances (e.g., about ten millimeters, or 10 mm) so that signal loss is tolerable. The free-air optical interface can scale to data rates up to ten gigabits per second (10 Gbps) (20 Gbps duplex communication, e.g., for USB 3.1 and above), and rates of one terabit per second (1 Tbps) or more may be available. This type of optical interface is not tied to any specific protocol and eliminates protocol overhead, which reduces the latency in communication to near zero latency. Further, the optical interface is agnostic to clock rate, making the interface compatible with high-speed and low-speed interfaces.

Optical communication interfaces, such as LAMDA, must have sufficient line of sight alignment between transmitter (TX) and receiver (RX) sections of master and slave devices, host and coupled devices, etc. For example, alignment accuracy of +/−0.75 mm may be required for a speed of 10 Gbps per lane at a separation distance of 5 mm for laser power not exceeding 30 mW at a frequency of 860 nm. An angular misalignment up to 3 degrees would be exceptional for a 20 Gbps full-duplex communication link. In other examples, for communication over longer distances, or where a direct line-of-sight is impossible, a hollow-core or air-core fiber (e.g., a photonic bandgap or other fiber, etc.) can be used, or an embedded hollow-core or air-core fiber or channel, such as within a printed circuit board (PCB) (e.g., direct from a silicon FR4 or other substrate, etc.).

The present inventor has recognized, among other things, interconnects for free-air optical communication, including free-air intrasystem interconnects (e.g., direct line-of-sight, chip-to-board, etc.), or interconnects using a fiber connection, such as hollow-core fiber bandgap fiber (e.g., board-to-fiber adapter, etc.), for example, to replace conventional, copper interconnects. Previous fiber-optic approaches failed due to high cost, high power, and unsuitable electrical interfaces (e.g., requiring air-tight, glass-to-glass connections to prevent dust buildup or Fresnel reflections).

The LAMDA interface disclosed herein can extend optical communication to intraboard and intrasystem interconnects, in certain examples, without the strict attach mechanisms or glass-glass, air-tight mating requirements of fiber-core or fiber-optic communication, and without the wiring complexity of copper-wire interconnects, requiring only sufficient line of sight alignment and gap adherence (e.g., 10 mm, etc.), such that complex mechanisms are not required. The LAMDA interface can be advantageous if, among other things, a direct line-of-sight is available, and speed, cost, or other conditions make copper wire routing difficult or costly (e.g., across hinges, short distances (e.g., board-to-board, or other high copper-routing complexity), connector space, confined space, high use, etc.). In other examples, such as when a direct line-of-sight is not available, or if the transmission distance is greater than a threshold distance (e.g., 10 mm, or one or more other distances, depending on the desired power level of the free-air optical communication, etc.), a hollow or air-core medium (e.g., fiber, tube, channel, etc.) can be used, for example, within or in combination with a standard connector (e.g., USB, etc.), and the laser emitter, photodiode, and trans-impedance amplifier disclosed herein.

From a user perspective, the learning curve is insignificant, as the interconnects disclosed herein look and behave the same as existing, common connectors, with the advantage of high-speed free-space optical interconnection. From a manufacturing perspective, a clean room environment is not required for production of such interfaces, reducing cost of production. Further, laser product level Class 1 certification is also achievable, as the small free-air interconnects disclosed herein (e.g., 0.8 mm×0.6 mm×0.2 mm, etc.) can be embedded deep inside a connector, and can be suitable for any size, even wearable, devices. The LAMDA interface disclosed herein can further enable routing high speed signals in large systems, such as all-in-one (AIO) systems, or across docking components, in the case of laptops, tablets, phones, or convertibles. Moreover, such free-air communication can provide a secure interface for data transfer, more secure than Thunderbolt (TBT), peripheral component interconnect (PCI), PCI-Express (PCIe), RF, or other interconnects. As physical contact is not required, hermetically sealed communication is now a possibility, using sealed optical interconnects. The bit-to-bit cost of data communication is also cheaper than RF counterparts. For example, using full duplex communication at full speed, the LAMDA interconnects and communications systems and methods can require only 80 mW for a 20 Gbps system, compared to 300 mW for a USB 3.0 repeater. Accordingly, the LAMDA interconnect disclosed herein represents a significant power savings.

FIG. 1 is an illustration of an embodiment of an optical communication interface including an optical transmitter (TX) receiver (RX) pair 100. The optical TX/RX pair 100 can include a laser emitter 105, such as a laser diode or a vertical-cavity surface emitting laser (VCSEL) for example.

The optical receiver can include a photodiode (PD) 110 to convert received laser energy into an electrical signal. When laser light falls on the photodiode 110, it produces a photo diode current. The current produced is proportional to the amount of laser light incident on the photodiode 110. When the laser light is modulated, the photodiode current varies with the intensity of the incident laser light.

A trans-impedance amplifier 115 (TIA) can be used to amplify the electrical signals generated by the photodiode 110. In some examples, the TIA 115 provides an average of the photodiode current generated by the photodiode 110. The laser emitter 105, the photodiode 110 and the TIA 115 are arranged on a substrate 120. Some examples of the substrate 120 include a printed circuit board (PCB) made of plastic, plastic laminate (E.g., FR4) or ceramic.

To form a serial duplex optical interface, a second optical TX/RX pair can be positioned opposite the optical TX/RX pair 100 in FIG. 1 (e.g., a first optical TX/RX pair). The laser emitter of the second optical TX/RX pair is arranged opposite the optical receiver of the first optical TX/RX pair to create a first communication lane, and the laser emitter of the first optical TX/RX pair is arranged opposite the optical receiver of the second TX/RX pair to form a second communication lane in the reverse direction from the first communication lane. An air gap separates the two TX/RX pairs. The separation between the first and second optical TX/RX pairs is small (e.g., about 2.5 mm). The small separation allows for the receivers to reliably detect the laser energy from the laser emitters. Each TX/RX pair can include a lens 125 to focus incident laser energy onto the photodiode 110. Each TX/RX pair may also include a second lens 130 to focus the emitted laser energy toward the receiving photodiode across the air gap. The lenses 125, 130 may be epoxy molded lenses.

In some embodiments, the photodiode 110 has a wide spectral response (e.g., an indium gallium arsenide (InGaAs) photodiode). The wide spectral response is desirable for detection of laser energy transmitted over air, but can cause problems of crosstalk between the two communication lanes. To reduce or eliminate crosstalk between communication lanes, a laser bandpass filter 135 is arranged above the photodiode 110 of each TX/RX pair. In some embodiments, the laser bandpass filter 135 can be a Lyot filter or a dichroic filter arranged above the photodiode 110. In some embodiments, the laser bandpass filter 135 is formed as a coating (e.g., an anti-reflective coating, or ARC) on the photodiode using ion beam sputtering (IBS). In some embodiments, the laser bandpass filter 135 is formed as a coating on the lens 125.

The laser bandpass filter 135 of a TX/RX pair has a passband that excludes the center frequency of the laser energy emitted by the laser emitter 105 of the TX/RX pair, but the passband includes the center frequency of the laser energy emitted by the laser emitter of the communication lane of the photodiode 110. Thus, the laser bandpass filter 135 reduces or eliminates laser energy from one communication lane from being detected by the other communication lane. In some embodiments, the center frequency of a laser emitter is assigned based on whether the laser emitter is included in a host device (e.g., a computing device or a mobile communication device) or a peripheral device (e.g., a disk drive). If a TX/RX pair is included in a host device, the TX/RX pair includes a laser emitter having a first center frequency and a laser bandpass filter that excludes the first center frequency. If a TX/RX pair is included in a peripheral device, the TX/RX pair includes a laser emitter having a second center frequency and a laser bandpass filter that excludes the second center frequency and passes the first center frequency. The TX/RX pair of the host device includes a laser bandpass filter that passes the second center frequency. Thus, the passband of the laser bandpass filter may be selected according to whether the TX/RX pair is included in the host device or peripheral device.

Figure 2:
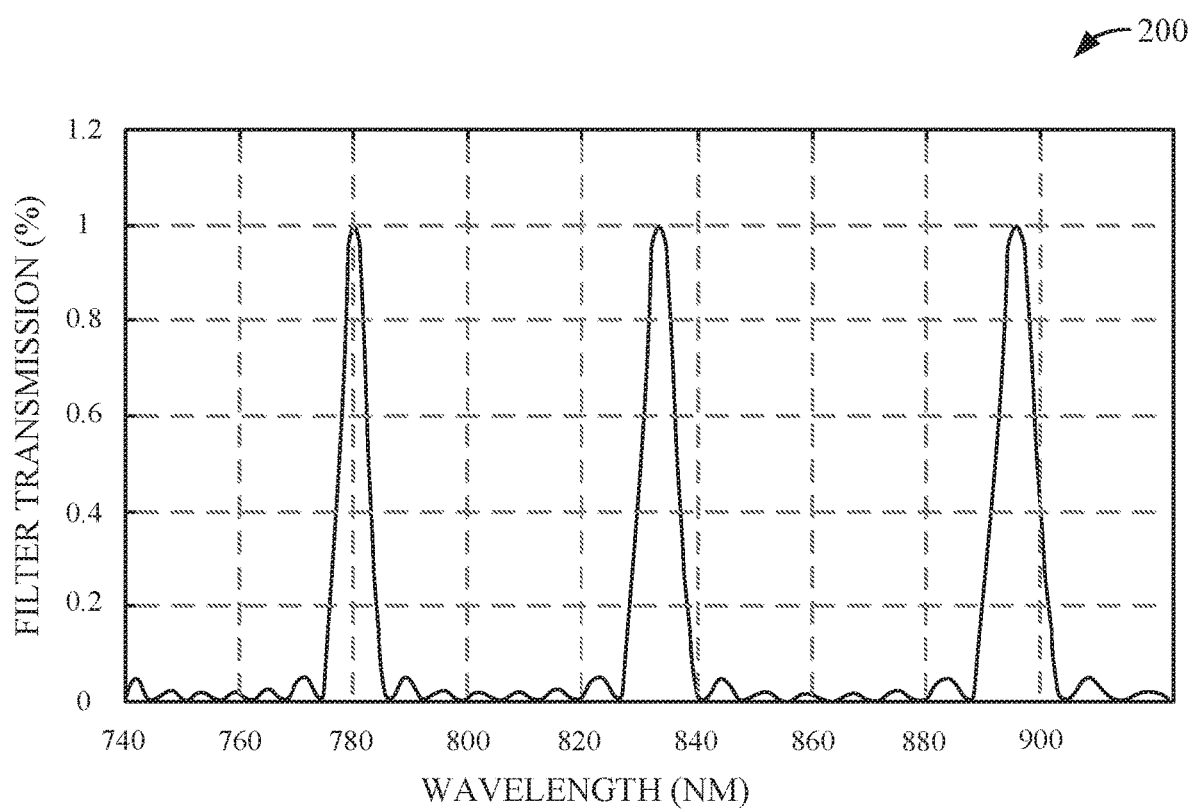
FIG. 2 is an illustration of a filter characteristic for a laser bandpass filter in accordance with some embodiments.

FIG. 2 is an illustration of a filter characteristic for a laser bandpass filter 200. The example is intended to be illustrative and non-limiting. The filter characteristic shows filter transmission versus wavelength. In the example, a host device laser emitter emits laser energy with a wavelength of 855 nanometers (nm), and a peripheral laser emitter emits laser energy with a wavelength of 830 nm. FIG. 2 shows an example of a filter characteristic for the host device. The filter shows very high attenuation at 855 nm and shows that the passband of the filter includes 830 nm.

Figure 3:
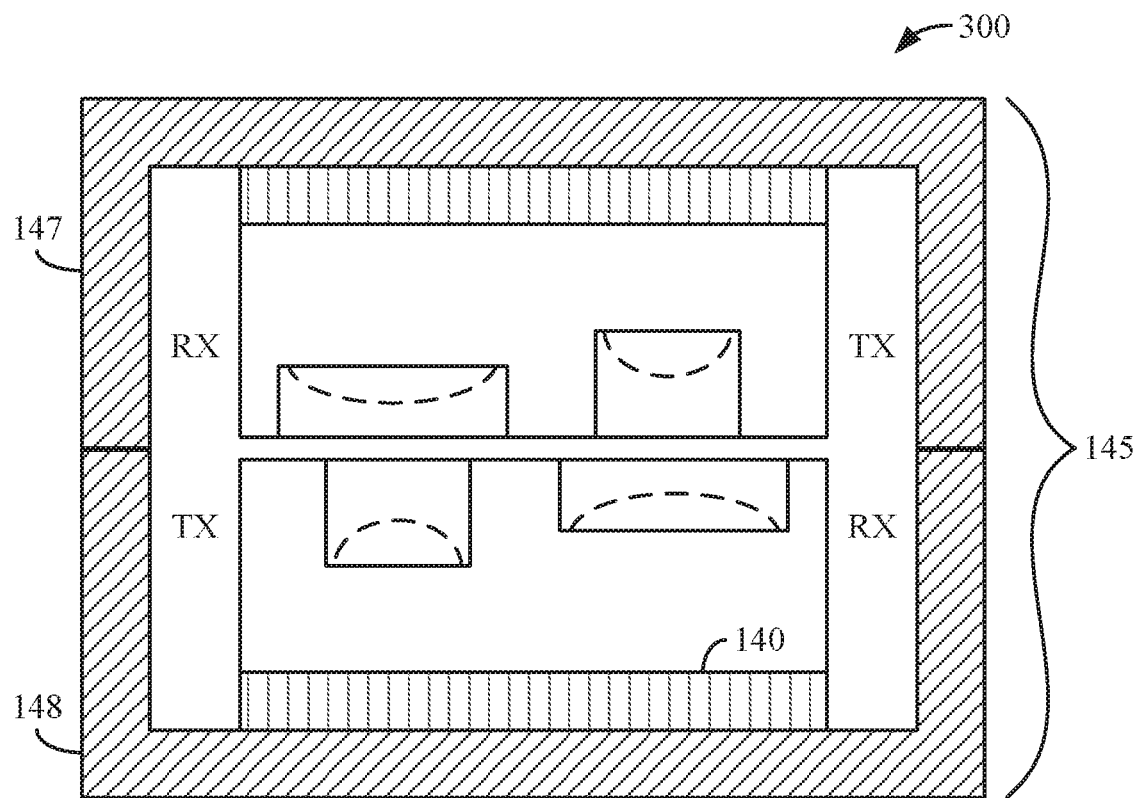
FIG. 3 is an illustration of an arrangement of optical TX/RX pairs in accordance with some embodiments.

FIG. 3 is an illustration of two optical TX/RX pairs arranged to form a duplex serial optical interface 300, including a mechanical connector 145 to house the interface and protect against interference from outside sources. The mechanical connector 145 may include first connector body portion 147 housing a first optical TX/RX pair (such as that illustrated in FIG. 1), and a second connector body portion 148 housing a second optical TX/RX pair, positioned opposite the first optical TX/RX pair to create a first and second communication lanes in reverse directions.

The first and second connector body portions 147, 148 can be coupled using one or more attach mechanisms. For example, the attach mechanism can include an adhesion-based attach mechanism (e.g., tape, glue, or one or more other adhesion-based mechanisms), a magnetic attach mechanism (e.g., permanent or fixed magnets, etc.), an electro-static attach mechanism, a mechanical attach mechanism, or a chemical attach mechanism, etc.

An air gap separates the two TX/RX pairs. The separation between the two optical TX/RX pairs is small (e.g., about 2.5 mm). The small separation allows for the optical receivers to reliably detect the laser energy from the laser emitters. The optical TX/RX pairs also include lenses. Portions of the lenses may have different curvature. The first lens portion may focus laser energy received across the air gap from a laser emitter onto a photodiode, and the second lens portion may focus laser energy from a laser emitter transmitted across the air gap toward a photodiode.

An optical TX/RX pair may be electrically connected to logic circuitry 140. The logic circuitry 140 transmits and receives signals communicated according to a duplex communication protocol, such as a USB protocol. In certain embodiments, the logic circuitry 140 may be arranged on one or both of the substrates. In some variations, one or both of the substrates are electronics package substrates and the laser emitters, the photodiodes, and the logic circuitry may be included in the same electronics package.

The center frequency of a laser emitter may be assigned based on the type of device. For example, the optical TX/RX pair of the second connector body portion 148 may be included in a host device, and the optical TX/RX pair of the first connector body portion 147 may be included in a peripheral device (e.g., a disc drive). The laser emitter of the host device TX/RX pair may emit laser energy at a first center frequency and may include a laser bandpass filter that excludes the first center frequency. The laser emitter of the peripheral device TX/RX pair may emit laser energy at a second center frequency and may have a laser bandpass filter that excludes the second center frequency and passes the first center frequency. The laser bandpass filter of the host device TX/RX pair passes the second center frequency. Therefore, the passband of the laser bandpass filter may be selected according to the type of device in which the TX/RX pair is included.

In certain embodiments, the substrate is an electronics package substrate and a laser emitter, a photodiode, and the logic circuitry 140 may be included in the same electronics package. Data is sent between devices or between optical links of the optical interface by transmitting laser energy via free air. It is desirable to keep the laser power low and also to prevent the laser emitters from firing into free air without any mechanical protective cover. This prevents the optical interface from exceeding class 1 laser certification. For consumer class devices, it is desirable for safety reasons to keep the laser emitters off until the two connector portions are joined and the two links of the optical interconnection are completely covered without laser light leaking or reflecting out from any side of the connector.

Figure 4:
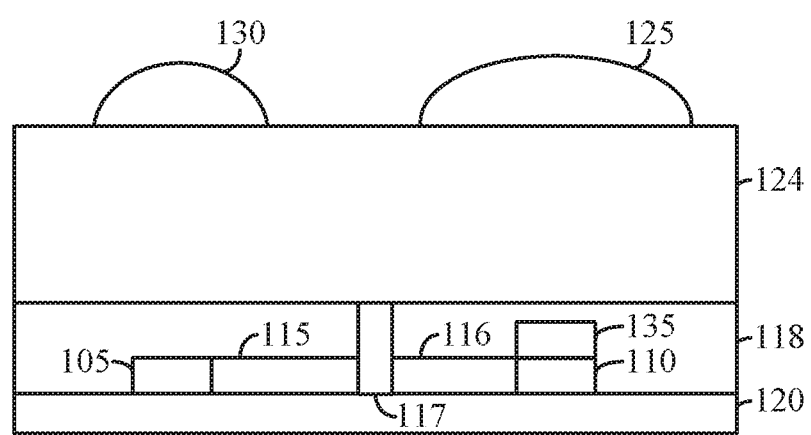
FIG. 4 is an illustration of an optical transmitter (TX) receiver (RX) pair in accordance with some embodiments.

FIG. 4 is an illustration of an optical transmitter (TX) receiver (RX) pair 400. The optical TX/RX pair can include a laser emitter 105, such as a laser diode or a vertical-cavity surface emitting laser (VCSEL) for example. The optical receiver can include a photodiode 110 to convert received laser energy into an electrical signal. A trans-impedance amplifier 116 (TIA) can be used to amplify the electrical signal generated by the photodiode 110. A drive amplifier 115 may also be included to translate signals to be transmitted to levels of power or voltage needed to drive the laser emitter 105. The laser emitter 105 and the photodiode 110 are arranged on a substrate 120. Some examples of the substrate 120 include a printed circuit board (PCB) made of plastic, a plastic laminate (e.g., FR4), or ceramic.

A resin 118 may be disposed on the substrate to encapsulate the electronics. The resin may be an optically clear resin (OCR) that flows before hardening. However, OCR may be susceptible to scratching. Because the optical interface is exposed to air rather than being protected using connections to fiber-optics, the optical TX/RX pair may need a surface with a higher degree of hardness than a resin can provide.

The optical TX/RX pair can include a lens 124. The lens may have a surface hardness rating of 8H or higher. The lens 124 can include a first lens portion 125 having a first curvature arranged above the photodiode 110 and a second lens portion 130 having a second curvature arranged above the laser emitter 105. The lens may be pre-formed prior to assembly and may include alumina silicate glass or a co-polymer coated poly (methyl methacrylate) (PMMA), such as sol-gel coated PMMA for example. The lens may have the same refractive index as the OCR to prevent reflections at the OCR/lens interface. The lens may also provide protection from humidity. An isolation barrier 117 may be arranged on the substrate between the laser emitter and the photodiode. The isolation barrier 117 may extend from the substrate to the top surface of the resin and may also serve as a support for the lens during curing of the resin.

It may be desirable to use a photodiode 110 that has a wide spectral response (e.g., an indium gallium arsenide (InGaAs) photodiode). The wide spectral response is desirable for detection of laser energy transmitted over air, but can cause problems of crosstalk between communication lanes, such as the two communication lanes of FIG. 3. To reduce or eliminate crosstalk between communication lanes, a laser bandpass filter 135 is arranged above the photodiode 110 of each TX/RX pair. In some embodiments, the laser bandpass filter can be a Lyot filter or a dichroic filter arranged above the photodiode. In some embodiments, the laser bandpass filter 135 is formed on a surface of the lens 124 that contacts the resin. The coating may be a thin film coating (e.g., an anti-reflective coating, or ARC) formed using ion beam sputtering (IBS) included on the surface of the lens contacting the resin.

The laser bandpass filter 135 of the TX/RX pair has a passband that excludes the center frequency of the laser energy emitted by the laser emitter of the same TX/RX pair, but the passband includes the center frequency of the laser energy emitted by the laser emitter opposite the photodiode in the communication lane of the photodiode. Thus, the laser bandpass filter 135 reduces or eliminates laser energy from one communication lane from being detected by the other communication lane.

Figure 5:
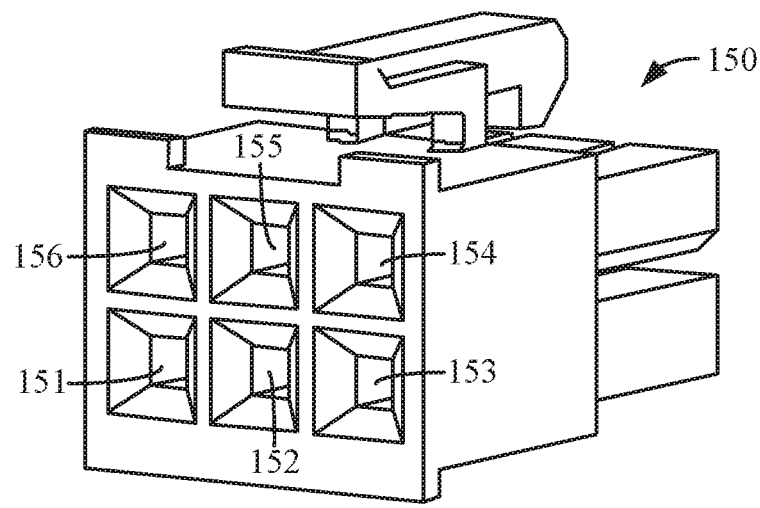
FIG. 5 is an illustration of a free-air optical connector having two power pins and four free-air interconnects in accordance with some embodiments.

FIG. 5 is an illustration of a free-air optical connector 150 having two power pins (e.g., source (Vcc) 151 and ground (GND) 152) and four free-air interconnects (e.g., Optic1 153, Optic2 154, Optic3 155, and Optic4 156). The free-air optical connector 150 illustrated in FIG. 5 can include a pitch connector (e.g., a 1 mm pitch connector). In other examples, the free-air optical interconnect 150 can include one or more other existing interconnects (e.g., USB, HDMI, DP, TBT, etc.). The present inventor has recognized, among other things, that a standard connector can be modified with a hollow or air-core medium (e.g., light pipes) configured to transfer optical signals between a combination of one or more additional hollow or air-core medium (e.g., light pipes, channels, hollow or air-core fibers, etc.), or one or more optical transmitter (TX) receiver (RX) pairs, or combinations thereof.

In an example, the four free-air interconnects can be free-air, hollow-core interconnects, configured such that, with the two power pins, the interconnect can provide up to 16 differential pairs at 20 Gbps per pair. The two power pins can provide a high-voltage, low-current output (e.g., 20V, 1 A, etc.). In various examples, the free-air optical connector 150 can carry 1×HDMI 2.0, 1×DP 1.4, 8×USB 3.1, and still have enough bandwidth to carry an additional 2×USB 3.1.

In certain examples, cables from the standard connectors can be replaced with different waveguide holes, with sets of holes matched for optical communication at a particular wavelength. A LAMDA receiver can have an ion beam sputtering (IBS) bandpass filter on each photodiode to separate different optical data streams and convert them back to electrical signals.

Figure 6:
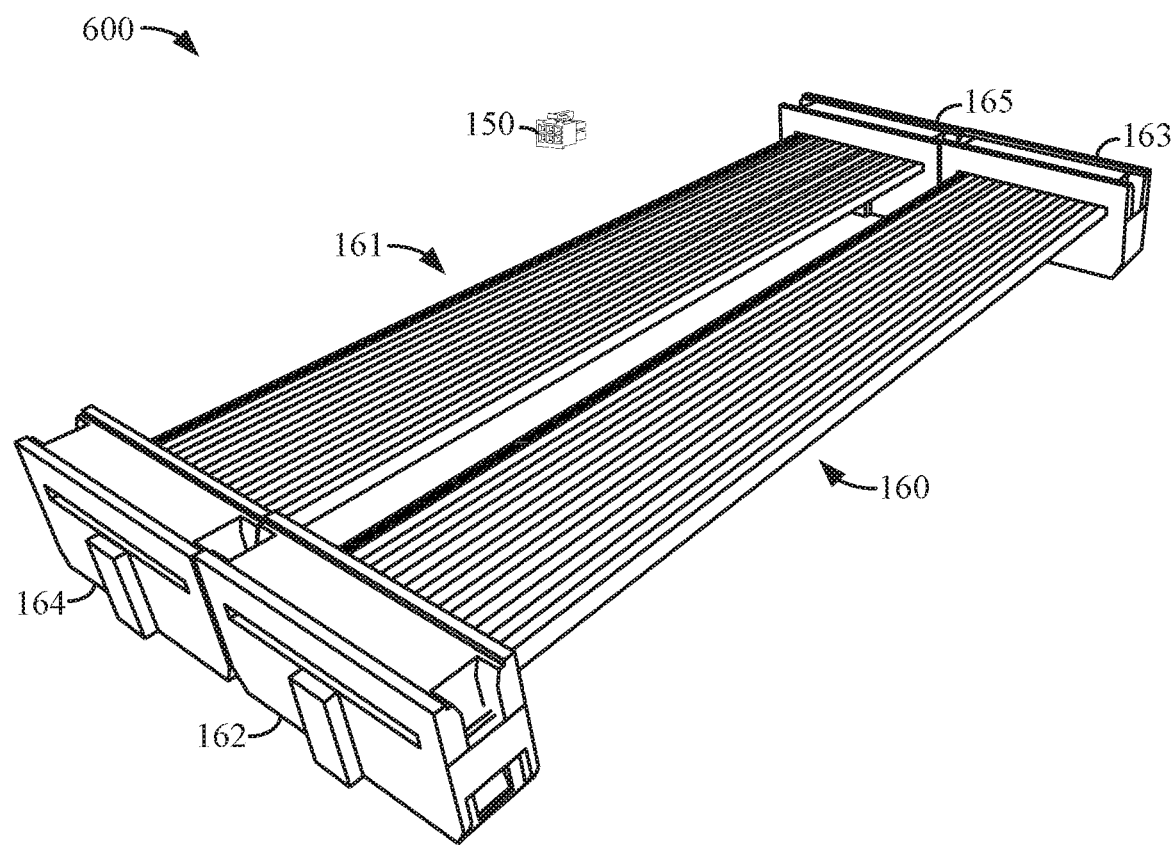
FIG. 6 is an illustration of a scale comparison between a state-of-the-art flex connector and a free-air optical connector in accordance with some embodiments.

FIG. 6 is an illustration of a scale comparison 600 of first and second state-of-the-art flex connectors 160, 161 and a free-air optical connector 150. The two flex connectors 160, 161 can include 0.5 mm pitch connectors with two power pins, together providing 16 differential pair. In contrast, the free-air optical connector 150, shown in a board-to-board form factor with 0.125 mm hollow-core channels, can provide the same 16 differential pairs, with higher speeds and lower power requirements, among other benefits, in a much smaller form factor.

Figure 7:
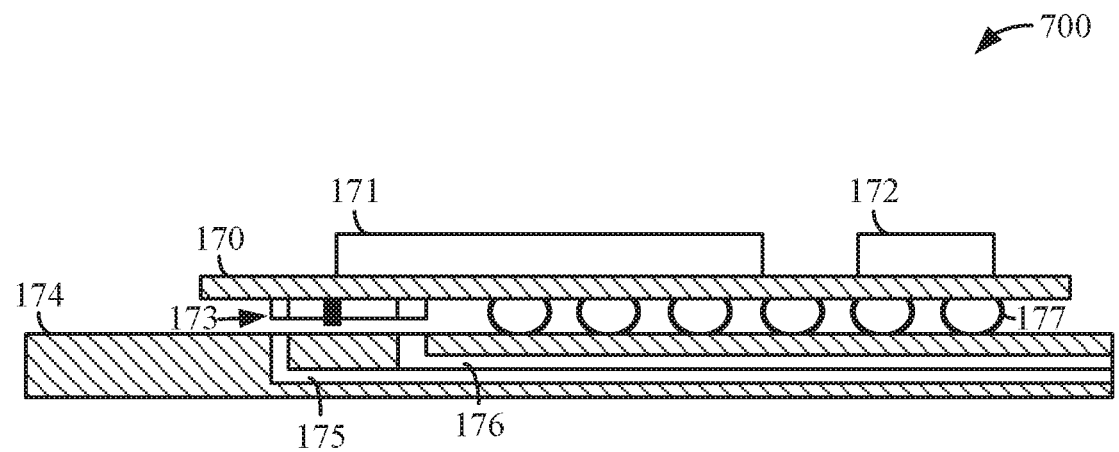
FIGS. 7-8 illustrate a board with embedded hollow-core fibers coupled to a chip carrier with a free-air optical interconnect in accordance with some embodiments.
Figure 8:
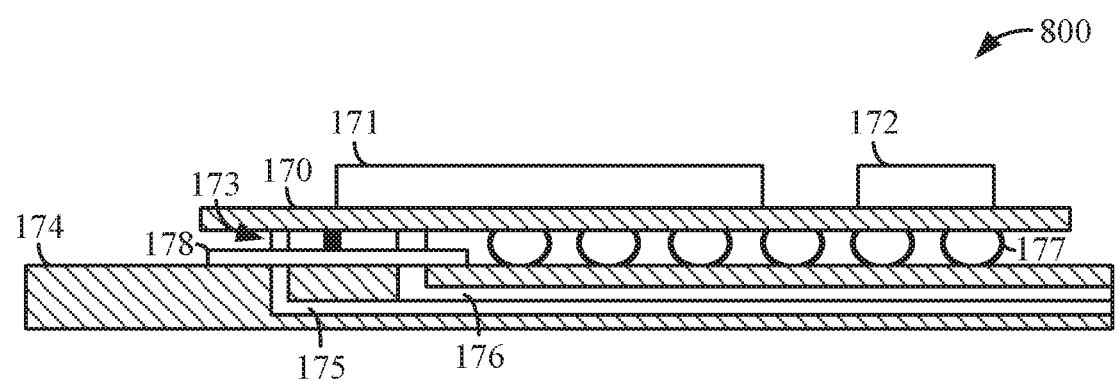

FIGS. 7-8 illustrate a board (e.g., a system motherboard (MB)) 174 with embedded hollow-core medium (e.g., first and second hollow-core fibers 175, 176) communicatively coupled to a chip carrier (e.g., FR4) 170 using an optical transmitter (TX) receiver (RX) pair 173, such as that illustrated in the examples of FIGS. 1-4. Direct chip attach of electronic components is enabling more dense board architecture, decreasing the size of electronic devices. Efforts are underway to reduce pin counts to make devices smaller; reducing size of the necessary connectors helps reduce the size of associated devices. A single TX/RX pair (e.g., LAMDA die) can be 0.8 mm×1.22 mm (or in certain examples, smaller), and can replace 4 pairs of RX and 4 pairs of TX at USB 3.1 speeds, a significant reduction in size.

The optical TX/RX pair 173 can include a laser emitter, a trans-impedance amplifier, an optional isolation barrier, and a photodiode. The optical TX/RX pair 173 can be physically attached to the chip carrier 170, and communicatively attached to one or more electronic components associated with the chip carrier 170, such as one or more integrated circuits (ICs) (e.g., a first system-on-a-chip (SOC) 171, a second SOC 172, etc.). The chip carrier 170 can be physically coupled to the board 174 using one or more attach mechanisms, such as one or more solder bumps (e.g., solder 177, etc.).

The embedded hollow-core (or air-core) medium can include hollow-core fibers, or one or more other hollow or air-core transmission mediums, and can be configured to transmit optical signals to or from the optical TX/RX pair 173 according to one or more transmission protocols. Further, optical communication (e.g., light channels) can be coupled directly into high-speed light channels (e.g., optical waveguides or other hollow or air core medium) in the PCB. In certain examples, fiber or optical waveguides can be built directly into the prepreg of the board 174. In an example, the hollow or air-core transmission medium can be placed and routed within the prepreg material prior to hardening uncured epoxy resin during the PCB fabrication process.

To aid in coupling the TX/RX pair 173 to the board 174 with very little reflections, the TX/RX pair 173 can be attached to a carrier substrate of the chip carrier 170. The board 174 can carry a hollow-core fiber, for example, as part of the prepreg (e.g., using hybrid PCB construction and 2.5D/R/P or other methods).

FIG. 7 illustrates a direct air coupling system 700 where the board 174 is communicatively coupled to the chip carrier 170 using the optical TX/RX pair 173. Such configuration represents an improvement in communication between the board 174 and the chip carrier 170 over other copper or RF communication, however, such arrangement does have losses.

FIG. 8 illustrates an optically clear resin (OCR) coupling system 800 where the board 174 is communicatively coupled to the chip carrier 170 using the optical TX/RX pair 173 and an optically clear resin (OCR) 178 to limit Fresnel reflections and other noise sources (e.g., dust, etc.). In an example, the OCR 178 is between the optical TX/RX pair 173 and the board 174, including, for example, optical inputs of the first and second hollow-core fibers 175, 176, such as one or more waveguides, openings, or other optical inputs.

Advantages of such free-air optical interconnects can include relaxed alignment requirements in contrast to existing fiber glass-glass or other interfaces, less mechanical wear, immunity from electrical noise or interference, the ability to stack hundreds of high-speed interconnect signals within a short distance or small area without interference, security from existing data attacks, etc. Further, in combination with a hollow-core fiber, connections can be made over a variety of distances, from millimeters to hundreds of meters or longer, with reduced loss (e.g., three or more times less loss than a convention cable, etc.).

In other examples, one or more of the free-air optical interconnects disclosed herein, in addition to communicating optical signals, can be configured to provide or receive power or otherwise communicate data using one or more electrical conductors requiring direct electrical contact of physical components (e.g., using the attach mechanism or other direct electrical contact, etc.).

In an example, one or more of the systems 700, 800 can include one or more alignment features, configured to align one or more of the chip carrier 170, the optical TX/RX pair 173, or the board 174, such that the optical TX/RX pair 173 is aligned over (and a proper distance from) respective inputs or openings of one or more of the embedded hollow-core medium (e.g., a waveguide, opening, or other transmission medium). In an example, one or more of the chip carrier 170 or the optical TX/RX pair 173 can include a physical alignment feature configured to interact with a physical alignment feature of the board 174 (e.g., male and female components or other alignment features). In other examples, the solder 177 and pads can be configured to align or provide for adequate alignment between the optical TX/RX pair 173 and the hollow or air-core medium.

Figure 9:
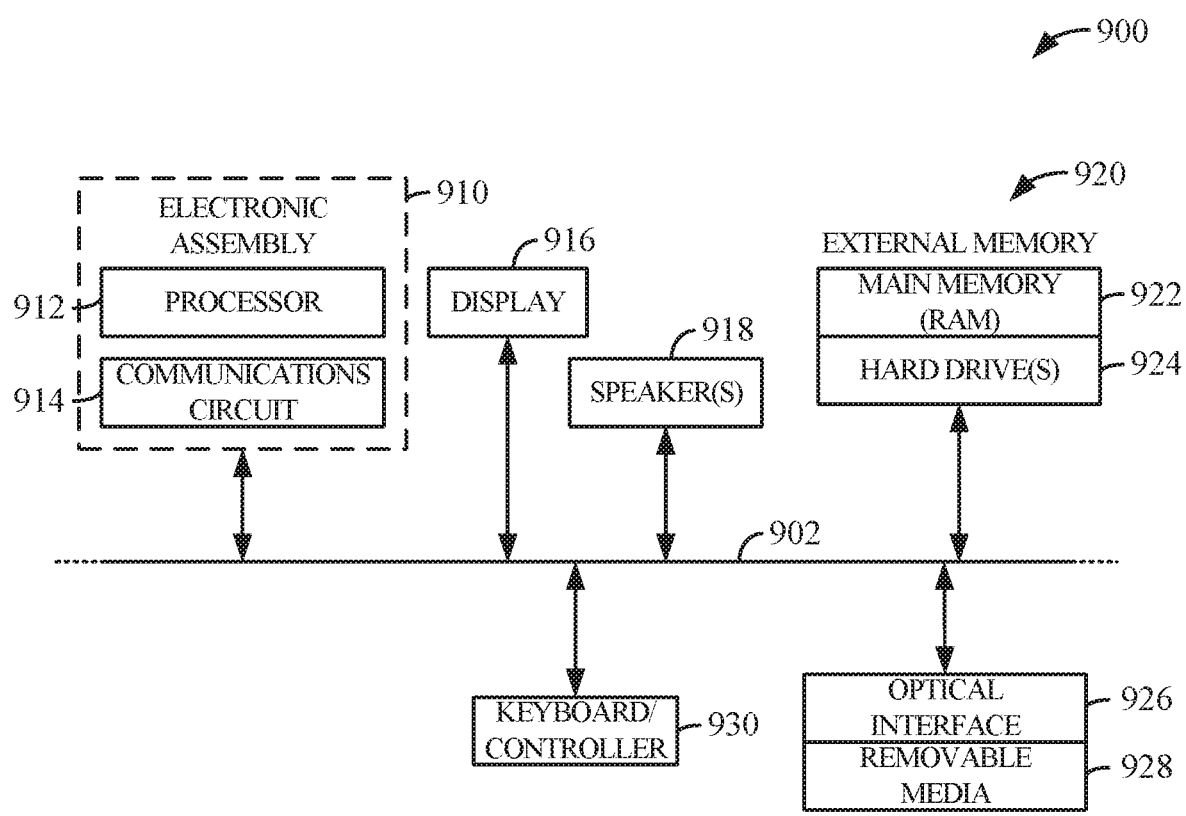
FIG. 9 is an illustration of a block diagram of an electronic system incorporating at least one electronic circuit assembly in accordance with some embodiments.

FIG. 9 is an illustration of a block diagram of an electronic system 900 incorporating at least one electronic circuit assembly in accordance with at least one embodiment of the invention. Electronic system 900 is merely one example in which embodiments of the present invention can be used. Examples of electronic systems include, but are not limited to personal computers, tablet computers, mobile telephones, game devices, compute sticks etc. In this example, electronic system 900 comprises a data processing system that includes a system bus 902 to couple the various components of the system. System bus 902 provides communications links among the various components of the electronic system 900 and can be implemented as a single bus, as a combination of busses, or in any other suitable manner.

An electronic assembly 910 can be coupled to system bus 902. The electronic assembly 910 can include any circuit or combination of circuits. In one embodiment, the electronic assembly 910 includes a processor 912 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in electronic assembly 910 are a custom circuit, an application-specific integrated circuit (ASIC), or the like. The electronic assembly can include a communications circuit 914 for use in wireless devices like mobile telephones, personal data assistants, portable computers, two-way radios, and similar electronic systems.

The electronic system 900 can also include an external memory 920, which in turn can include one or more memory elements suitable to the particular application, such as a main memory 922 in the form of random access memory (RAM), one or more hard drives 924. The electronic assembly 910 can also include a free-air optical interface 926 for removable media 928 such as compact disks (CD), flash memory cards, digital video disk (DVD), and the like.

The electronic system 900 can also include a display device 916, one or more speakers 918, and a keyboard and/or controller 930, which can include a mouse, trackball, touch screen, voice-recognition device, or any other device that permits a system user to input information into and receive information from the electronic system 900.

ADDITIONAL DESCRIPTION AND EXAMPLES

These several embodiments and examples can be combined using any permutation or combination. The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

In Example 1, a system includes a communication interface configured to be coupled to a chip carrier, the communication interface including a laser emitter configured to transmit laser energy to a first hollow-core transmission medium of a board, and a photodiode configured to detect laser energy communicated from a second hollow-core transmission medium of the board.

In Example 2, the system of Example 1 optionally includes the chip carrier, and the board including the first hollow-core transmission medium configured to receive transmitted laser energy from the laser emitter of the communication interface, and the second hollow-core transmission medium configured to communicate laser energy to the photodiode of the communication interface.

In Example 3, one or more of Examples 1-2 optionally includes an integrated circuit disposed on a first surface of the chip carrier, wherein the communication interface is disposed on a second surface of the chip carrier, the second surface opposite the first surface, and wherein the communication interface includes a trans-impedance amplifier configured to amplify a signal generated by the photodiode.

In Example 4, the board of any one or more of Examples 1-3 optionally includes a motherboard, and the integrated circuit of any one or more of Examples 1-3 optionally includes a system on a chip (SOC) configured to be communicatively coupled to an electronic component through the communication interface and the first and second hollow-core optical transmission mediums of the motherboard.

In Example 5, any one or more of Examples 1-4 optionally includes first and second alignment features configured to align the laser emitter and the photodiode of the communication interface over inputs of the first and second hollow-core optical transmission mediums, respectively, wherein the first alignment feature is optionally associated with the board, and the second alignment feature is optionally associated with one of the communication interface or the chip carrier.

In Example 6, the first and second hollow-core optical transmission mediums of any one or more of Examples 1-3 are optionally embedded in the board.

In Example 7, the first and second hollow-core optical transmission mediums of any one or more of Examples 1-6 optionally includes first and second hollow-core fibers embedded in a prepreg layer of the board.

In Example 8, the chip carrier of any one or more of Examples 1-7 is optionally physically attached to the board using solder, and wherein the chip carrier is communicatively coupled to the first and second hollow-core optical transmission mediums using the communication interface.

In Example 9, the communication interface of any one or more of Examples 1-8 is optionally separated from the board by an air gap.

In Example 10, any one or more of Examples 1-9 optionally includes an optically clear resin between the communication interface and optical inputs of the first and second hollow-core optical transmission mediums of the board.

In Example 11, a method includes transmitting laser energy to a first hollow-core transmission medium of a board using a laser emitter of a communication interface coupled to a chip carrier, and detecting laser energy from a second hollow-core transmission medium of the board using a photodiode of the communication interface.

In Example 12, the method of Example 11 optionally includes receiving laser energy from the laser emitter of the communication interface at the first hollow-core transmission medium of the board, and communicating laser energy to the photodiode of the communication interface using second hollow-core transmission medium of the board.

In Example 13, any one or more of Examples 11-12 optionally include receiving electrical signals from an integrated circuit disposed on a first surface of the chip carrier and amplifying signals generated by the photodiode using a trans-impedance amplifier of the communication interface, wherein the communication interface is disposed on a second surface of the chip carrier, the second surface opposite the first surface.

In Example 14, the board of any one or more of Examples 11-13 optionally includes a motherboard, and the integrated circuit of any one or more of Examples 11-13 optionally includes a system on a chip (SOC) configured to be communicatively coupled to an electronic component through the communication interface and the first and second hollow-core optical transmission mediums of the motherboard.

In Example 15, the laser emitter and the photodiode of the communication interface of any one or more of Examples 11-14 are optionally positioned over inputs of the first and second hollow-core optical transmission mediums, respectively, using first and second alignment features, wherein the first alignment feature is optionally associated with the board, and the second alignment feature is optionally associated with one of the communication interface or the chip carrier.

In Example 16, the first and second hollow-core optical transmission mediums of any one or more of Examples 11-15 are optionally embedded in the board.

In Example 17, the first and second hollow-core optical transmission mediums of any one or more of Examples 11-16 optionally include first and second hollow-core fibers embedded in a prepreg layer of the board.

In Example 18, any one or more of Examples 11-17 optionally include communicatively coupling the chip carrier to the first and second hollow-core optical transmission mediums using the communication interface, wherein the chip carrier of any one or more of Examples 11-17 is optionally physically attached to the board using solder.

In Example 19, the communication interface of any one or more of Examples 11-18 is optionally separated from the board by an air gap.

In Example 20, the communication interface of any one or more of Examples 11-19 is optionally physically separated from optical inputs of the first and second hollow-core optical transmission mediums of the board with an optically clear resin.

In Example 21, a system or apparatus can include, or can optionally be combined with any portion or combination of any portions of any one or more of Examples 1-20 to include, means for performing any one or more of the functions of Examples, 1-20, or a machine-readable medium including instructions that, when performed by a machine, cause the machine to perform any one or more of the functions of Examples 1-20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject

What is claimed is:

1. A system comprising:
a communication interface configured to be coupled to a chip carrier, the communication interface including at least one optical transmitter receiver pair that includes:
a laser emitter configured to transmit laser energy to a first hollow-core transmission medium of a board; and
a photodiode disposed adjacent to the laser emitter and configured to detect laser energy communicated from a second hollow-core transmission medium of the board; and
an optical bandpass filter disposed at the photodiode and having a passband that excludes the center frequency of the transmit laser frequency.

2. The system of claim 1, including:
the chip carrier; and
the board including the first hollow-core transmission medium configured to receive transmitted laser energy from the laser emitter of the communication interface, and the second hollow-core transmission medium configured to communicate laser energy to the photodiode of the communication interlace.

3. The system of claim 2, including:
an integrated circuit disposed on a first surface of the chip carrier,
wherein the communication interface is disposed on a second surface of the chip carrier, the second surface opposite the first surface, and
wherein the communication interface includes a trans-impedance amplifier configured to amplify a signal generated by the photodiode.

4. The system of claim 3, wherein the board includes a motherboard, and
wherein the integrated circuit includes a system on a chip (SOC) configured to be communicatively coupled to an electronic component through the communication interface and the first and second hollow-core optical transmission mediums of the motherboard.

5. The system of claim 1, including:
first and second alignment features configured to align the laser emitter and the photodiode of the communication interface over inputs of the first and second hollow-core optical transmission mediums, respectively,
wherein the first alignment feature is associated with the board, and
wherein the second alignment feature is associated with one of the communication interface or the chip carrier.

6. The system of claim 1, wherein the first and second hollow-core optical transmission mediums are embedded in the board.

7. The system of claim 6, wherein the first and second hollow-core optical transmission mediums include first and second hollow-core fibers embedded in a prepreg layer of the board.

8. The system of claim 1, wherein the chip carrier is physically attached to the board using solder, and wherein the chip carrier is communicatively coupled to the first and second hollow-core optical transmission mediums using the communication interface.

9. The system of claim 8, wherein the communication interface is separated from the board by an air gap.

10. The system of claim 1, including:
an optically clear resin between the communication interface and optical inputs of the first and second hollow-core optical transmission mediums of the board.

11. A method comprising:
transmitting laser energy to a first hollow-core transmission medium of a board using a laser emitter of a communication interface coupled to a chip carrier; and
detecting laser energy from a second hollow-core transmission medium of the board using a photodiode of the communication interface disposed adjacent to the laser emitter; and
filtering to exclude a center frequency of the transmit laser energy from the laser energy detected at the photodiode.

12. The method of claim 11, including:
receiving laser energy from the laser emitter of the communication interface at the first hollow-core transmission medium of the board; and
communicating laser energy to the photodiode of the communication interface using second hollow-core transmission medium of the board.

13. The method of claim 11, including:
receiving electrical signals from an integrated circuit disposed on a first surface of the chip carrier; and
amplifying signals generated by the photodiode using a trans-impedance amplifier of the communication interface,
wherein the communication interface is disposed on a second surface of the chip carrier, the second surface opposite the first surface.

14. The method of claim 13, wherein the board includes a motherboard, and
wherein the integrated circuit includes a system on a chip (SOC) configured to be communicatively coupled to an electronic component through the communication interface and the first and second hollow-core optical transmission mediums of the motherboard.

15. The method of claim 11, wherein the laser emitter and the photodiode of the communication interface are positioned over inputs of the first and second hollow-core optical transmission mediums, respectively, using first and second alignment features,
wherein the first alignment feature is associated with the board, and
wherein the second alignment feature is associated with one of the communication interface or the chip carrier.

16. The method of claim 11, wherein the first and second hollow-core optical transmission mediums are embedded in the board.

17. The method of claim 16, wherein the first and second hollow-core optical transmission mediums include first and second hollow-core fibers embedded in a prepreg layer of the board.

18. The method of claim 11, including:
communicatively coupling the chip carrier to the first and second hollow-core optical transmission mediums using the communication interface,
wherein the chip carrier is physically attached to the board using solder.

19. The method of claim 18, wherein the communication interface is separated from the board by an air gap.

20. The method of claim 11, wherein the communication interface is physically separated from optical inputs of the first and second hollow-core optical transmission mediums of the board with an optically clear resin.

* * * * *

UNITED STATES PATENT AND TRADEMARK OFFICE
CERTIFICATE OF CORRECTION

| | | |
|---|---|---|
| PATENT NO. | : 11,294,127 B2 | |
| APPLICATION NO. | : 16/326443 | |
| DATED | : April 5, 2022 | |
| INVENTOR(S) | : Arvind Sundaram | |

It is certified that error appears in the above-identified patent and that said Letters Patent is hereby corrected as shown below:

On the Title Page

In item (71), in "Applicants", in Column 1, Lines 1-3, delete "Applicants: Intel Corporation, Santa Clara, CA (US); Arvind Sundaram, Bangalore (IN)" and insert --Applicant: Intel Corporation, Santa Clara, CA (US)-- therefor In the Claims In Column 13, Line 33, in Claim 2, delete "interlace." and insert --interface.-- therefor Signed and Sealed this
Eighteenth Day of October, 2022

Katherine Kelly Vidal
*Director of the United States Patent and Trademark Office*